United States Patent [19]
Seymour et al.

[11] Patent Number: 5,818,671
[45] Date of Patent: Oct. 6, 1998

[54] CIRCUIT BREAKER WITH ARCING FAULT DETECTION MODULE

[75] Inventors: Raymond K. Seymour, Plainville; Edward E. Kim, Burlington, both of Conn.

[73] Assignee: General Electric Company, New York, N.Y.

[21] Appl. No.: 726,896

[22] Filed: Oct. 4, 1996

[51] Int. Cl.[6] .................................................. H02H 3/00
[52] U.S. Cl. .................................. 361/42; 361/87; 361/94
[58] Field of Search ........................ 361/93–97, 99–100, 361/102–103, 105, 42, 43, 87, 45; 335/23–25, 31–32, 39–40, 43, 35, 201

[56] References Cited

U.S. PATENT DOCUMENTS

| | | | |
|---|---|---|---|
| 4,345,288 | 8/1982 | Kampf et al. | 361/31 |
| 4,513,268 | 4/1985 | Seymour et al. | 335/35 |
| 4,513,342 | 4/1985 | Rocha | 361/94 |
| 4,667,263 | 5/1987 | Morris et al. | 361/42 |
| 4,688,134 | 8/1987 | Freeman et al. | 361/45 |
| 4,878,143 | 10/1989 | Kalal et al. | 361/94 |
| 5,224,006 | 6/1993 | MacKenzie et al. | 361/45 |
| 5,307,230 | 4/1994 | MacKenzie | 361/96 |
| 5,420,740 | 5/1995 | MacKenzie et al. | 361/45 |
| 5,452,223 | 9/1995 | Zuercher et al. | 364/483 |
| 5,510,946 | 4/1996 | Franklin | 361/56 |
| 5,519,561 | 5/1996 | Mrenna et al. | 361/105 |

*Primary Examiner*—Jeffrey A. Gaffin
*Assistant Examiner*—Michael J. Sherry
*Attorney, Agent, or Firm*—Richard A. Menelly; Carl B. Horton

[57] ABSTRACT

An arcing fault detecting module is attached to a circuit breaker employing a thermal-magnetic trip unit to separate the circuit breaker contacts upon occurrence of an arcing fault. The arcing fault module contains a logic circuit and a current transformer for detecting the arcing fault and actuating a trip solenoid to articulate the circuit breaker operating mechanism and separate the circuit breaker contacts.

6 Claims, 3 Drawing Sheets

CIRCUIT BREAKER WITH ARCING FAULT DETECTION MODULE

BACKGROUND OF THE INVENTION

Circuit breakers currently used to protect residential environments are described in U.S. Pat. No. 4,513,268 entitled "Automated Q-Line Circuit Breaker". In the aforementioned patent, trip units in the form of combined thermal and electromagnetic sensors are used to determine the presence of overcurrent conditions and to release an operating mechanism to separate the circuit breaker contacts.

To provide ground fault protection facility to such residential circuit breakers, a ground fault module such as described in U.S. Pat. No. 4,667,263 entitled "Ground Fault Module for Ground Fault Circuit Breaker" is attached to the circuit breaker and interacts with the circuit breaker operating mechanism to interrupt circuit current upon occurrence of a ground fault.

When it is desired to detect and interrupt conditions, such as so-called "arcing faults", that may be harmful to the protected circuit but are not readily sensed by thermal and electromagnetic trip units, electronic circuits such as described in U.S. Pat. No. 5,307,230 entitled "Circuit Breaker With Protection Against Sputtering Arc Faults", U.S. Pat. No. 5,452,223 entitled "Arc Detection Using Current Variation", U.S. Pat. No. 5,510,946 entitled Circuit Breaker Protection Against 'Arc Short Circuit' Hazards" and U.S. Pat. No. 5,519,561 entitled "Circuit Breaker Using Bimetal of Thermal-Magnetic Trip to Sense Current" are proposed.

In view of the economic advantage with circuit breakers employing thermal-magnetic trip units, it would be desirable to incorporate arcing fault protection within such circuit breakers without incurring substantial costs.

One purpose of the invention is to describe an arcing fault detection module that can be attached to a circuit breaker having a thermal-magnetic trip for sensing arcing faults and interrupting the protected circuit immediately upon detection thereof.

SUMMARY OF THE INVENTION

An arcing fault detecting module is attached to a circuit breaker employing a thermal-magnetic trip unit to separate the circuit breaker contacts upon occurrence of an arcing fault. The arcing fault module contains a logic circuit and a current transformer for detecting the arcing fault and actuating a trip solenoid to articulate the circuit breaker operating mechanism and separate the circuit breaker contacts. The logic circuit includes electronic means for determining an absolute value of the arcing fault signal, comparing the signal to a threshold and generating a trip signal when the threshold is exceeded.

DESCRIPTION OF THE PREFERRED EMBODIMENT

Figure 1:
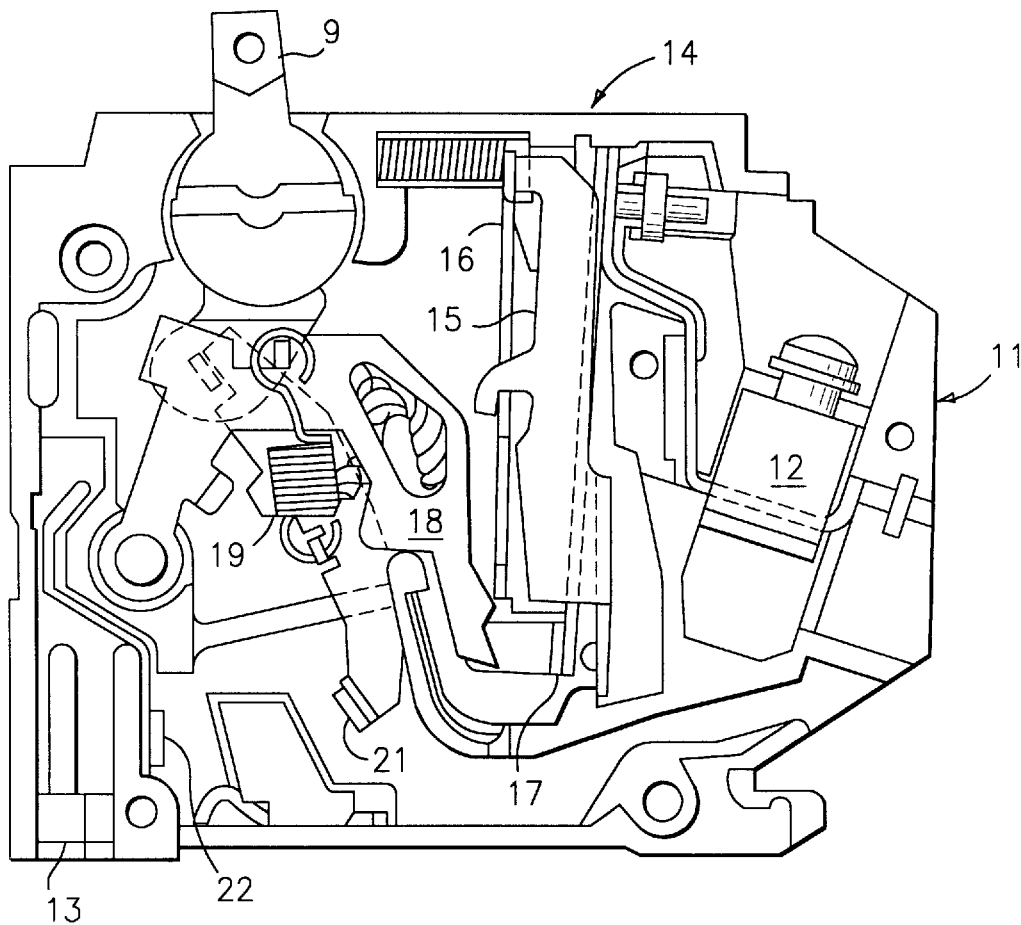
FIG. 1 is a front plan view of a circuit breaker containing a thermal-magnetic trip unit according to the prior art.

A state-of-the-art residential circuit breaker 10 having the externally operated handle 9 is shown in FIG. 1 to consist of a molded plastic case 11. The circuit current transfers from the load terminal lug 12, thermal-magnetic trip unit 14, fixed and moveable contacts 22, 21 to the line terminal stab 13. The thermal-magnetic trip unit includes a magnet 15 and armature 16 that are arranged for operation upon occurrence of so-called "short circuit" and "short time" fault conditions within the protected circuit. "Long time" overcurrent protection is provided by means of the bimetal 17 as described within the aforementioned U.S. Pat No. 4,513,268. The operating cradle 18 interacts with armature 15 to hold the contacts from being separated by the bias provided by the operating spring 19.

Figure 2:
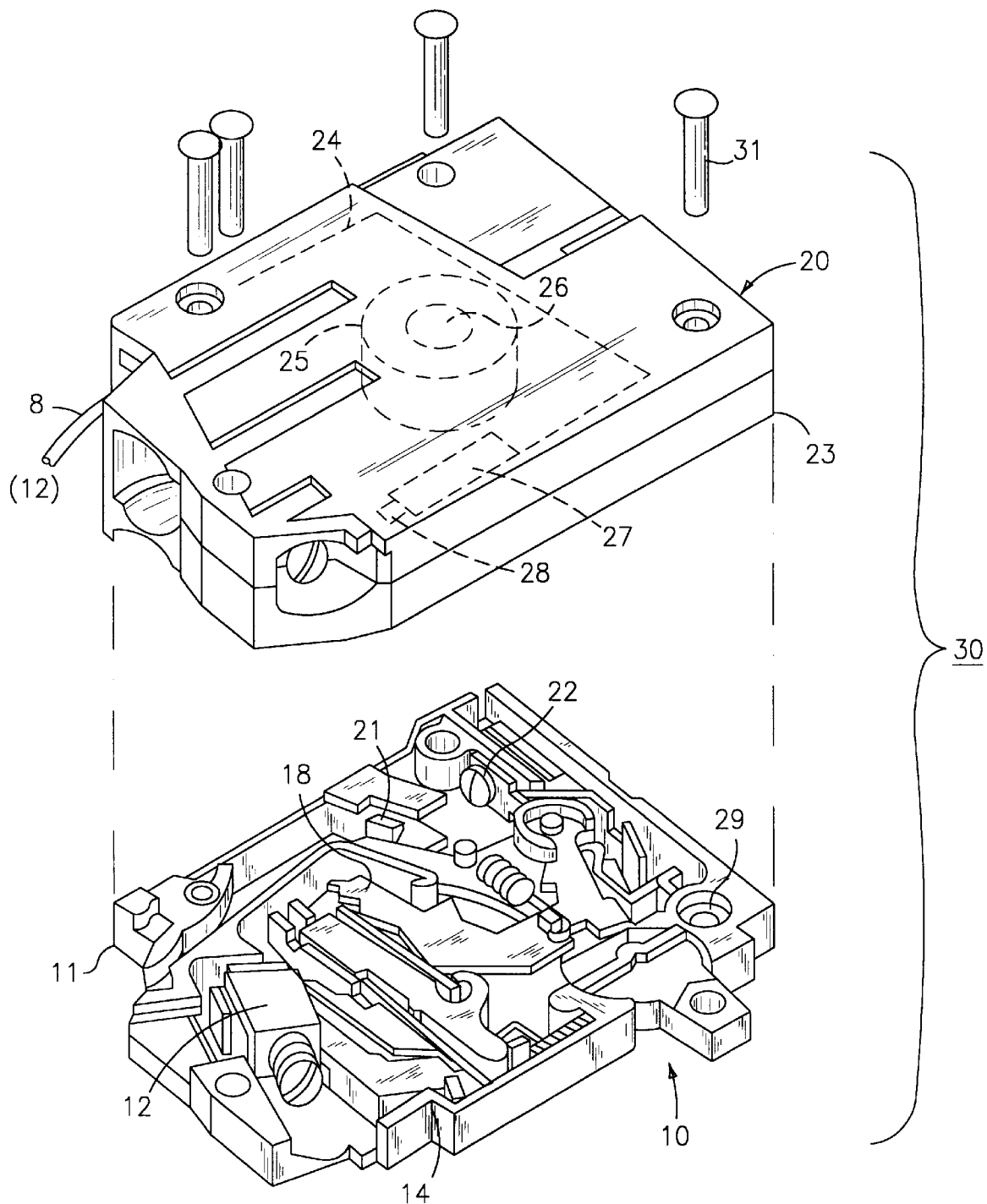
FIG. 2 is a top perspective view of the circuit breaker of FIG. 1 with the arcing fault module of the invention in isometric projection.
Figure 3:
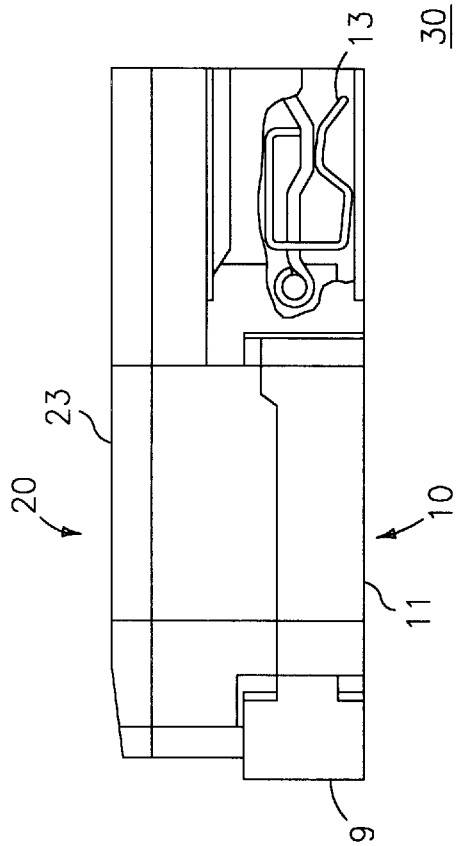
FIG. 3 is a rear plan view of the arcing fault module of FIG. 2 attached to the circuit breaker of FIG. 2.

In accordance with the invention, a combined arcing fault and circuit breaker unit 30 is depicted in FIGS. 2 and 3 and is formed by attaching the case 23 of an arcing fault module 20 to the case 11 of a circuit breaker 10 by means of rivets 31 and apertures 29, as indicated. The arcing fault module is similar to the ground fault module described in the aforementioned U.S. Pat. No. 4,667,263 with the air core sensing transformer 25 substituted for the iron core transformer used for ground fault detection. The input current on the load lug 12 (FIG. 1) is applied to a wire conductor 8 which passes through the aperture 26 in the air core sensing transformer. The printed wire board 24 containing the arcing fault sensing circuit 40 is substituted for the ground fault sensing components in the aforementioned U.S. Pat. No. 4,667,263. The trip solenoid 27 operates in a similar manner to the ground fault trip solenoid and projects a trip armature 28 into contact with the circuit breaker operating cradle 18 to separate the circuit breaker contacts 22, 21 independent of the circuit breaker trip unit 14. Electrical connection with the associated electric circuit is made by means of the line terminal stab 13 and the ON-OFF state of the contacts is controlled by the operating handle 9.

Figure 4:
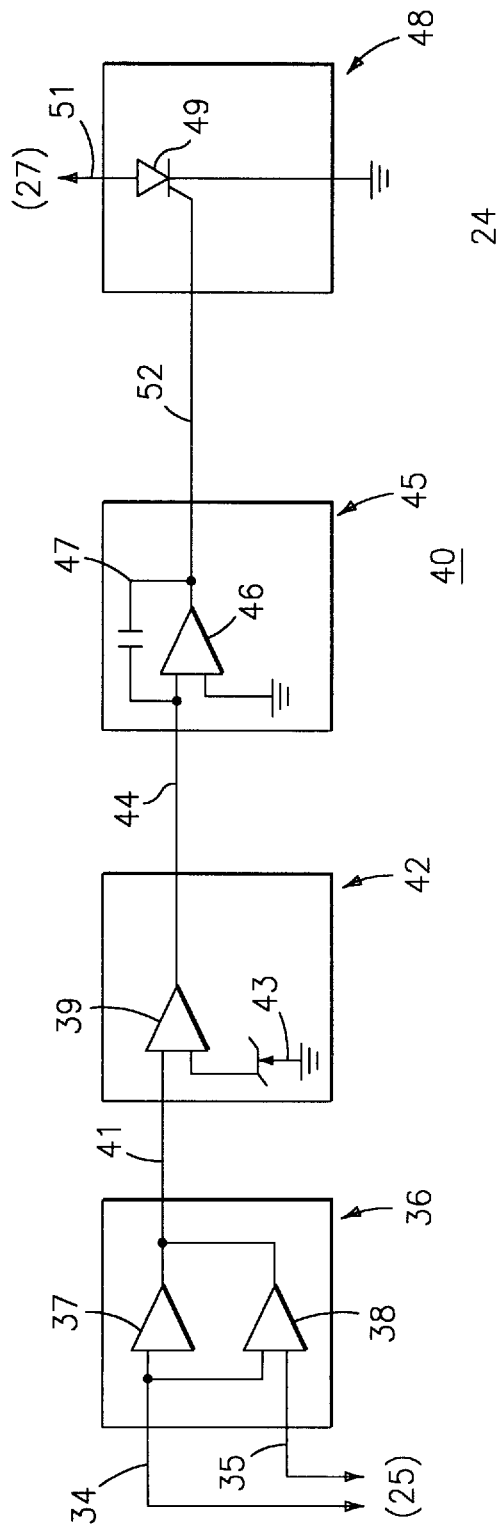
FIG. 4 is a diagrammatic representation of the arcing fault detection circuit within the arcing fault module of FIG. 2.

The components within the arcing fault circuit that is contained within the printed wire board 24 (FIG. 2) are best seen by now referring to FIG. 4. A pair of conductors 34, 35 connecting with the output of the air core sensing current transformer 25 (FIG. 2) are inputted to a pair of parallel-connected operational amplifiers 37, 38 having a built-in bandpass filter within the conditioning circuit 36 to generate an output signal proportionate to the absolute value of the arcing current. This signal is inputted over conductor 41 to a first comparator 39 within the threshold detector circuit 42, which first comparator is connected with ground through the anode of a first zener diode 43, to generate a threshold signal representative of the arcing fault current. The threshold signal is next inputted over conductor 44 to a second comparator 46, having a built-in discriminator, within an integrator circuit 45, having one input connected with its output via a feed-back capacitor 47 and the other input connected to ground. The integrated output is connected by conductor 52 with the gate of an electronic switch such as an FET (not shown) or an SCR 49 and to ground through the cathode of the SCR within the trip detector circuit 48. The anode of the SCR connects with the trip solenoid 27 (FIG. 2) by conductor 51 and the SCR is turned on to output a trip signal to the trip solenoid when the arcing fault current remains above a predetermined value for a predetermine period of time.

The operation of the arcing fault circuit is based on the understanding that the rate of flux generated within the air core sensing current transformer 25 (FIG. 2) is proportional to the time rate of change of the arcing fault current (di/dt). This air core sensing current transformer is accordingly used to sense current for sensing sputtering arc fault, the absolute value of which is obtained within the conditioning circuit 36 by inverting the negative component within the operational amplifiers 37, 38 to obtain an absolute value indicative of the arcing fault current. This value is compared to a predetermined "white noise" and normal switching level within the threshold detector circuit 42 to eliminate the possibility of nuisance tripping when power tools, hair dryers and the like are operating within the protected circuit. The arcing current value above threshold is then integrated over a predetermined time period within the integrator circuit 45 to insure that the arcing fault condition persists before providing a trip signal to the trip detector circuit 48 to interrupt the arcing fault current before fire damage could occur within the protected circuit.

A supplemental module having electronic means for determining the occurrence of an arcing fault within a protected circuit had herein been described. The module is connected with a circuit breaker having short circuit, long time and overcurrent protection.

We claim:

1. An arcing fault module comprising:

a solenoid switch having a tripping armature;

a current sensing transformer for connecting with a protected circuit;

a conditioning circuit connecting with said current sensing transformer for providing an absolute value representation of arcing fault current within a protected circuit;

a threshold circuit connecting with said conditioning circuit for comparing said absolute value to a predetermined value;

an integrator circuit connecting with said threshold circuit for determining whether said arcing fault current persists greater than a predetermined time increment; and an electronic switch connecting with said integrator circuit for producing a trip signal output when said arcing fault current persists greater than said predetermined time increment.

2. The arcing fault module of claim 1 wherein said current sensing transformer comprises an air core.

3. The arcing fault module of claim 1 wherein said conditioning circuit comprises a pair of amplifiers.

4. The arcing fault module of claim 1 wherein said threshold circuit comprises a first comparator.

5. The arcing fault module of claim 1 wherein said integrator circuit comprises a second comparator.

6. The arcing fault module of claim 1 wherein said electronic switch comprises an SCR.

* * * * *